US009343803B2

(12) United States Patent
Cisneros Gonzalez et al.

(10) Patent No.: US 9,343,803 B2
(45) Date of Patent: May 17, 2016

(54) REARVIEW MIRROR DEVICE INTEGRATING A RADIO-FREQUENCY RECEPTION SYSTEM

(75) Inventors: Carlos Cisneros Gonzalez, Sant Cugat Del Valles (ES); Enrique Martinez Ortigosa, Sant Cugat Del Valles (ES); Ramiro Quintero Illera, Sant Cugat Del Valles (ES)

(73) Assignee: ADVANCED AUTOMOTIVE ANTENNAS, S.L., Sant Cugat del Valles (ES)

( * ) Notice: Subject to any disclaimer, the term of this patent is extended or adjusted under 35 U.S.C. 154(b) by 1203 days.

(21) Appl. No.: 13/225,303

(22) Filed: Sep. 2, 2011

(65) Prior Publication Data

US 2012/0056791 A1 Mar. 8, 2012

(30) Foreign Application Priority Data

Sep. 8, 2010 (EP) .................................... 10175766

(51) Int. Cl.

*H01Q 1/02* (2006.01)
*H01Q 1/32* (2006.01)
*B60R 1/12* (2006.01)
*H01Q 1/12* (2006.01)
*H01Q 1/36* (2006.01)
*H01Q 15/00* (2006.01)

(52) U.S. Cl.

CPC .......... *H01Q 1/3266* (2013.01); *H01Q 1/1278* (2013.01); *H01Q 1/36* (2013.01); *H01Q 15/0093* (2013.01)

(58) Field of Classification Search

CPC ........................................................ H01Q 1/02
USPC ......................................................... 343/704
See application file for complete search history.

(56) References Cited

U.S. PATENT DOCUMENTS

| | | | |
|---|---|---|---|
| 4,086,594 A | 4/1978 | Kropielnicki et al. | |
| 4,422,077 A | 12/1983 | Kropielnicki | |
| 5,835,066 A | 11/1998 | Kropielnicki et al. | |
| 6,307,516 B1 | 10/2001 | Zafar et al. | |
| 6,936,347 B2 * | 8/2005 | Laird et al. | 428/432 |
| 2004/0056810 A1 | 3/2004 | Oka | |

(Continued)

FOREIGN PATENT DOCUMENTS

| | | | |
|---|---|---|---|
| DE | 102005001486 | 10/2006 | |
| ES | WO2006061218 | * 6/2006 | H01Q 1/36 |

(Continued)

OTHER PUBLICATIONS

European Search Report, dated Mar. 22, 2011, issued in European Patent App. No. EP 10175766.

*Primary Examiner* — Dameon E Levi
*Assistant Examiner* — Andrea Lindgren Baltzell
(74) *Attorney, Agent, or Firm* — Knobbe Martens Olson & Bear LLP

(57) ABSTRACT

The invention relates to a rearview mirror device for vehicles incorporating a radio-frequency reception system. The rear-view mirror device comprises: a light-reflective surface made of an electrically conductive material, and at least one planar conductive element lying on a plane substantially parallel to said reflective surface. The light-reflective surface and said conductive element are capacitively coupled and are used in combination for the reception of radio-frequency signals. The invention provides a rearview mirror with great simplicity and very-low cost.

15 Claims, 7 Drawing Sheets

(56) References Cited

U.S. PATENT DOCUMENTS

| | | | | |
|---|---|---|---|---|
| 2008/0234895 | A1* | 9/2008 | Veerasamy | 701/36 |
| 2009/0231219 | A1 | 9/2009 | Sugimoto et al. | |
| 2009/0237313 | A1* | 9/2009 | Martinez Ortigosa | 343/713 |
| 2010/0026590 | A1 | 2/2010 | Chiang et al. | |

FOREIGN PATENT DOCUMENTS

| | | |
|---|---|---|
| WO | WO 01/54225 | 7/2001 |
| WO | WO 2005/117204 | 12/2005 |
| WO | WO 2006/061218 | 6/2006 |

* cited by examiner

REARVIEW MIRROR DEVICE INTEGRATING A RADIO-FREQUENCY RECEPTION SYSTEM

CROSS-REFERENCE TO RELATED APPLICATIONS

This application claims priority under 35 U.S.C. §119(a)-(d) to European Patent Application No. 10175766.4 filed on Sep. 8, 2010, the content of which is incorporated herein by reference in its entirety.

DESCRIPTION

Object of the Invention

It is an object of the present invention to provide a rearview mirror device for vehicles incorporating a radio-frequency reception system. It is also an object of the invention to implement such a rearview mirror with great simplicity and very-low cost.

The radio-frequency reception system is implemented by using as an antenna for the reception of RF-signals, some of the components intrinsically existing in a rearview mirror.

BACKGROUND OF THE INVENTION

It is well know in the state of the art to use the heating element of a windshield of a vehicle simultaneously as a transmitting aerial and for heating purposes. The following patents are examples of this technique: U.S. Pat. No. 4,422,077, U.S. Pat. No. 5,835,066, U.S. Pat. No. 6,307,516, U.S. Pat. No. 4,086,594, each of which is hereby incorporated by reference in its entirety.

In particular the U.S. Pat. No. 4,422,077 describes an isolating and matching device to enable a motor vehicle electrically heated window, not designed specifically to be an antenna or aerial and essentially aperiodic and non-resonant at VHF frequencies, to be used as a transmitting aerial. The device described therein comprises: an electrical circuit having input leads for connection to a motor vehicle D.C. power supply, power output leads for connection to a window heating element of said motor vehicle electrically heated window, and an aerial input terminal for connection of said electrical circuit to an aerial feeder circuit of a transmitter.

On the other hand, the PCT publication WO 01/54225 entitled "Space-filling miniature antennas", describes that space-filling curve is defined as a curve composed by at least ten segments, said segments being shorter than a tenth of the free-space operating wavelength, wherein said segments are connected in such a way that each segment forms an angle with their neighbours, that is, no pair of adjacent segments define a larger straight segment, and wherein the space-filling curve does not intersect with itself at any point except optionally at the initial and final points of the space-filling curve. WO 01/54225 is hereby incorporated by reference in its entirety.

DESCRIPTION OF THE INVENTION

The present invention provides a technique for using an intrinsic element of a rearview mirror for vehicles as a radio antenna, with similar performance than specifically designed antennas integrated in rearview mirrors.

In the present invention it has been found that the light-reflective surface of a rearview mirror, typically made of an electrically conductive material such as chrome, is a suitable element for receiving radio-frequency signals as long as it is excited properly and suitably connected with the radio equipment of a motor vehicle.

More in particular, the invention refers to a rearview mirror device which integrates a radio-frequency reception system, which preferably comprises at least one planar conductive element suitably arranged inside the rearview mirror to be capacetively coupled with the light-reflective surface of the mirror, typically made of chrome, so that the light-reflective surface is used as an antenna for the reception radio-frequency signals in a motor vehicle.

Said planar conductive element is lying on a plane substantially parallel to the reflective surface and is located at selected distance from the light-reflective surface to be capacetively coupled with it, so that the chrome surface in combination with the conductive element are suitable for the reception of radio-frequency signals at the desired band of operation, when they are connected with a radio-reception equipment. The conductive element is used to excite the chrome layer, for that the conductive element is capacetively coupled with the chrome layer.

This capacitive value (C) between the light-reflective surface and the conductive element, is calculated using the equation 1 (eq 1) below, wherein "d" is the distance between said two conductors, (S1,S2) are the area of the surfaces of the respective conductors, and (∈0, ∈r) are respectively the electric permittivity of the air (∈0), and the relative permittivity of the dielectric medium (∈r), that is, the materials between S1 and S2. Properly performance for radio reception is achieved when the value of this coupling is greater than 1 pF.

$$C=\epsilon_0\cdot\epsilon_r\cdot S1\cdot S2/d \qquad \text{(equ 1)}$$

The rearview mirror device also comprises a heating conductor used as a defroster for the light-reflective surface. The conductive element is connected with at least one connection terminals used for supplying a DC voltage to the heating conductor.

Therefore, the path and shape of the heating conductor are selected to achieve an optimum value of capacitive coupling effect with the light-reflective surface at the desired band of operation, as (equ 1) when the capacitance coupling reaches the minimum value of 1 pF.

Under this condition of capacitance coupling, the heater conductor has the dual functionality of heating and receive the RF signals without adding additional surface conductors. For this situation, a splitter circuit is used to separate the DC current which feeds the heating conductor from the RF received signals.

DESCRIPTION OF THE DRAWINGS

To complement this description and in order to aid a better understanding of the invention's characteristics, according to a preferred practical embodiment thereof, there is a set of illustrative and non-limiting drawings integral to said description, which are as follows.

PREFERRED EMBODIMENT OF THE INVENTION

Figure 1:
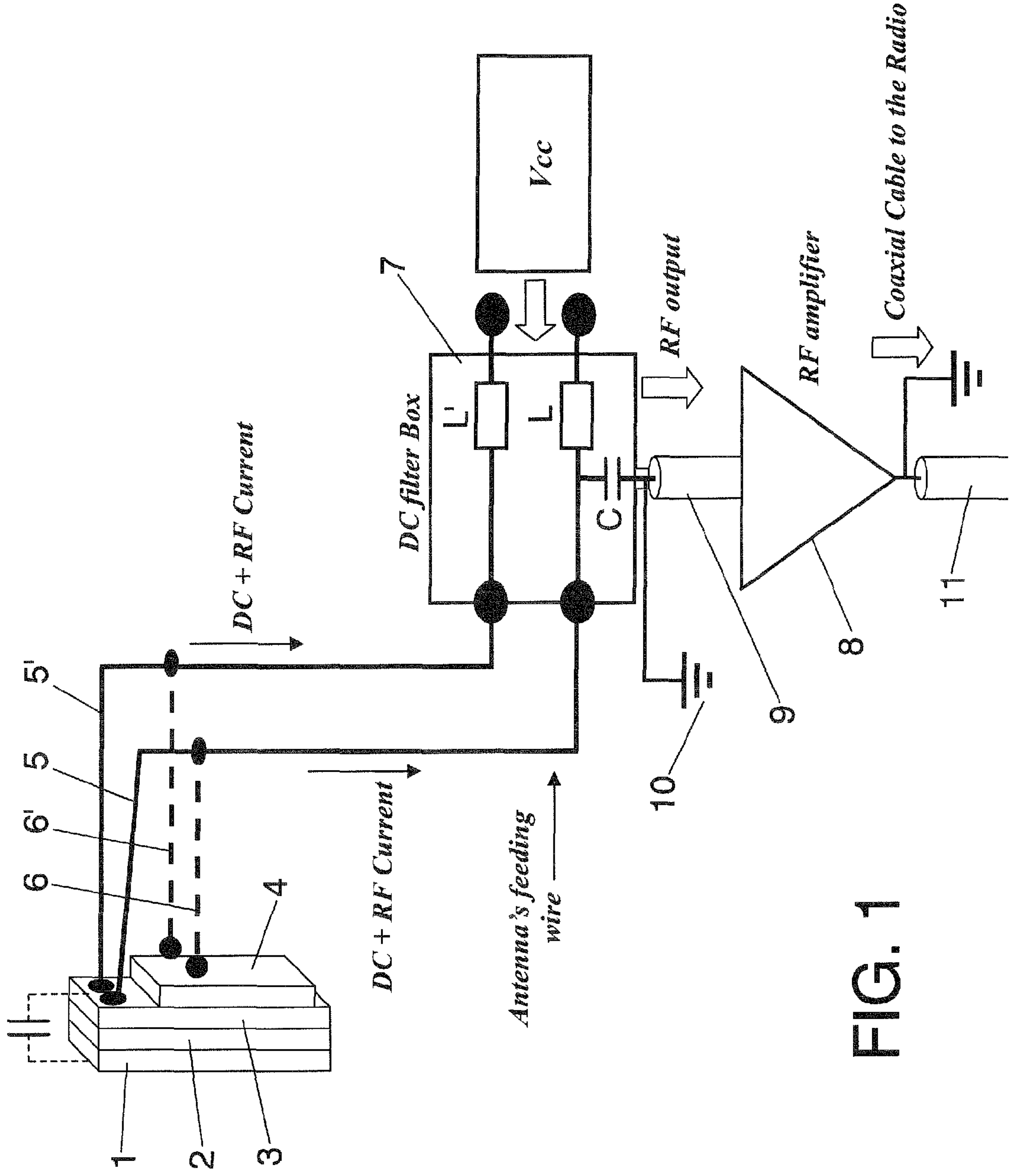
FIG. 1.—shows an schematic electric diagram of an exemplary embodiment of the rearview mirror device of the invention.

FIG. 1 shows a schematic diagram of an exemplary embodiment of the invention, wherein the rearview mirror device comprises a light-reflective surface (1) consisting of a layer of chrome, a planar heating conductor (3) sandwiched with the layer of chrome through a dielectric layer (2). The heating conductor (3) is used as a defroster of the light-reflective surface (1).

One planar conductive element (4) is lying on a plane substantially parallel to said reflective surface (1), and the distance between the reflective surface (1) and said conductive element (4) is selected in order to have both elements capacitively so that both in combination are suitable to operate as an antenna for the reception of radio-frequency signals.

The heating conductor (2) has two connection terminals (5,5"), for feeding the heating conductor with a dc voltage (Vcc) supplied by the battery of a motor vehicle. In turn said conductive element (4) has two connection nodes (6,6') which are respectively connected with said connection terminals (5,5'), so that the radio-frequency (RF) current captured by the chrome layer is added to the dc current.

The rearview mirror device includes a splitter device (7) for separating a RF and DC signals. Said splitter device includes a first and a second inductors (L", L) connected respectively between the connection terminals (5,5') and a dc source (Vcc) of a vehicle as shown in FIG. 1. The splitter device (7) also includes a capacitor (C) connected between one of the connection terminals (5,5') and a RF amplifier (8) through a coaxial cable (9). The capacitor (C) is connected with the inner conductor of the coaxial, and the shield conductor of this coaxial cable is connected to the vehicle's ground (10).

The inductors (L', L) allow the dc current from the dc source (Vcc) to flow and feed the heating conductor, but they block the RF current to flow through the dc source (Vcc). The capacitor (C) allows the RF current to flow through the RF amplifier, but it blocks the dc current.

A second coaxial cable (11) connects the amplifier (8) with a radio-equipment of a vehicle (not shown).

Figure 2:
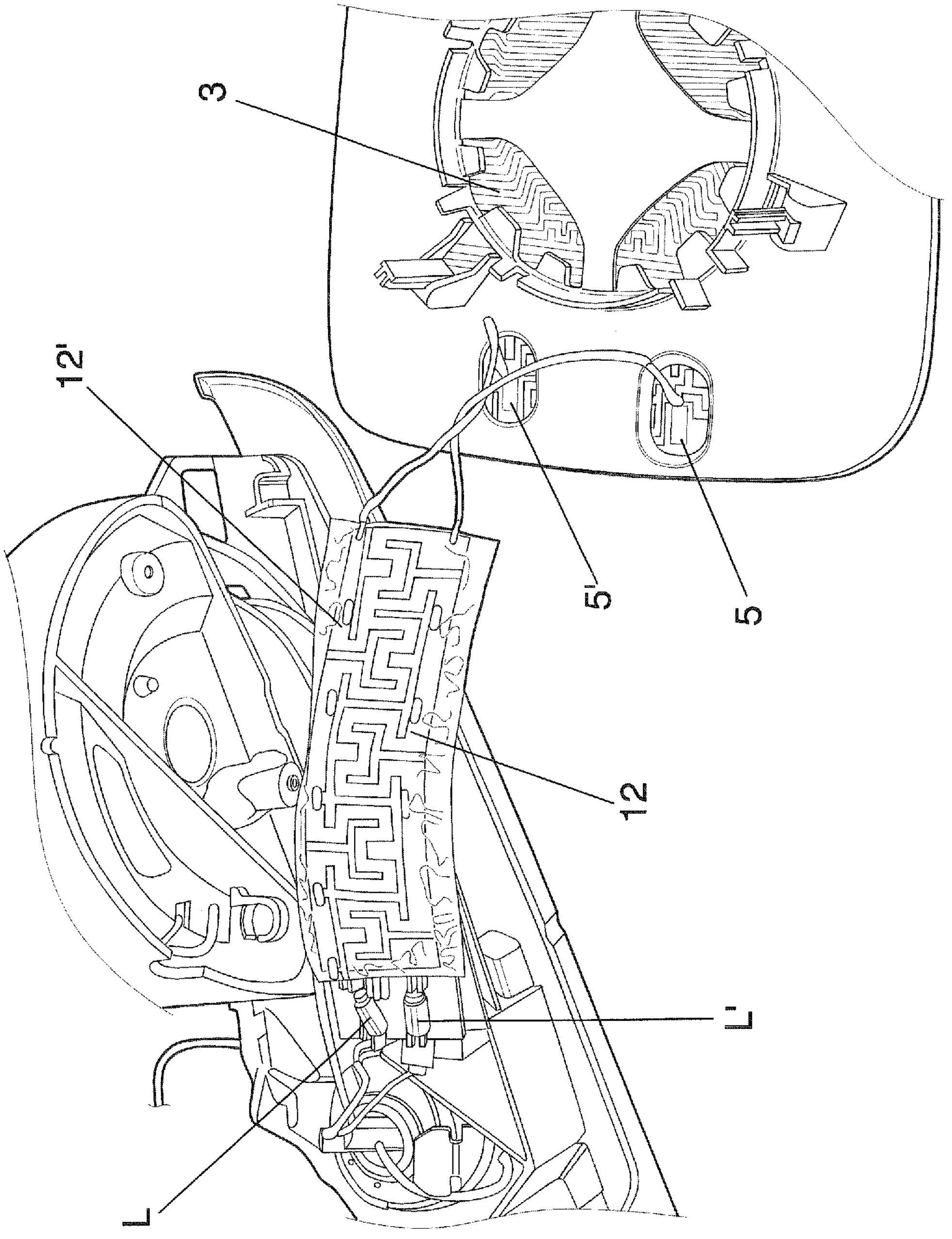
FIG. 2.—shows a perspective view of a rearview mirror incorporating a matching conductor shaped as a space-filing curve.

As shown in FIG. 2, preferably a pair of matching conductors (12,12') are connected in series respectively between the connection terminals (5,5") and the inductors (L,L'). These matching conductors (12,12') are shaped as a space-filling curve, and their dimension are selected to adapt in impedance de antenna formed by the chrome layer and the conductive layer.

In the present description a space-filling curve is to be understood as defined previously in this description in respect to the PCT publication WO 01/54225.

Figure 3:
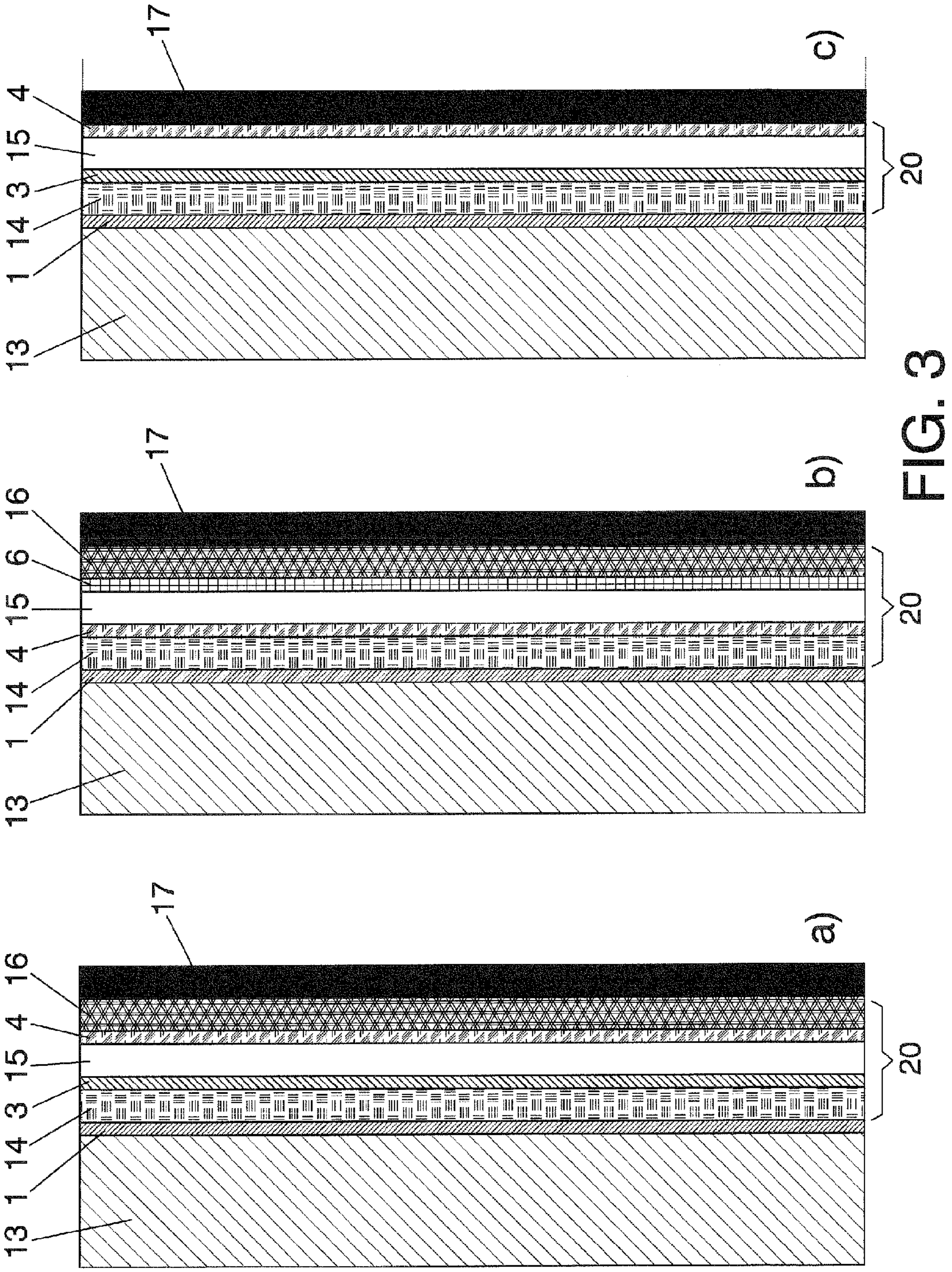
FIG. 3.—shows an schematic cross-sectional views of three exemplary arrangements of a mirrored substrate, the heating conductor and the conductive element.

Preferably, the light-reflective surface, the heating conductor and the conductive element are manufactured in a sandwiched arrangement as shown in FIG. 3. In the embodiments of FIG. 3 the layers are arranged as follows from left to right as shown in the figures:

FIG. 3(*a*): a transparent substrate (13) such a cristal or plastic, a light-reflective layer (1) made of chrome, a first dielectric layer (14) made of resine, heater conductor (3) made of aluminium, a second dielectric layer (15) made of resine, the conductive element (4), third dielectric layer (16) and a plastic support (17) to support the arrangement inside the rearview mirror.

FIG. 3(*b*): a transparent substrate (13) such a cristal or plastic, a light-reflective layer (1) made of chrome, a first dielectric layer (14) made of resine, the conductive element (4), a second dielectric layer (15) made of resine, heater conductor (6) made of aluminium, third dielectric layer (16) and a plastic support (17) to support the arrangement inside the rearview mirror.

FIG. 3(*c*): is the same as FIG. 3(*a*) but the third dielectric layer (16) is not used. Instead, the conductive element is applied directly on a face of the plastic support (17), for example by printing the conductive element on the plastic support or by overmoulding it during its manufacturing process.

The heating conductor is arranged to heat said light-reflective surface and to be capacetively coupled with light-reflective surface with the minimum value of the capacitance needed for suitably receiving radio signals, so that the heating conductor provides the dual functionality of heater and antenna.

Figure 4:
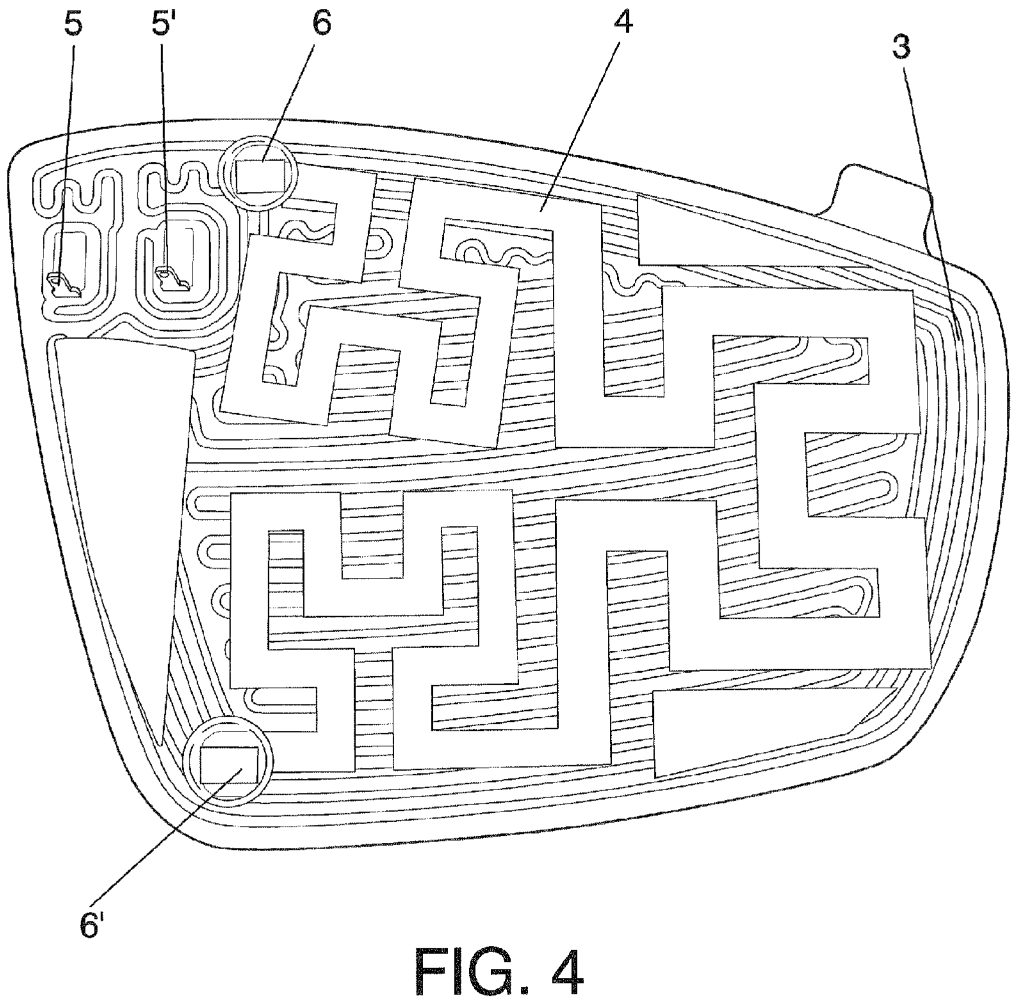
FIG. 4.—shows a plant view of a mirrored substrate, the heating conductor and the conductive element.

FIG. 4 shows an example of the configuration of the conductive element (4) shaped as a space-filling curve. The conducting element (4) has two connection nodes (6,6') and it is applied over the heating conductor (3) which in turn has two connection terminals (5,5').

Figure 5:
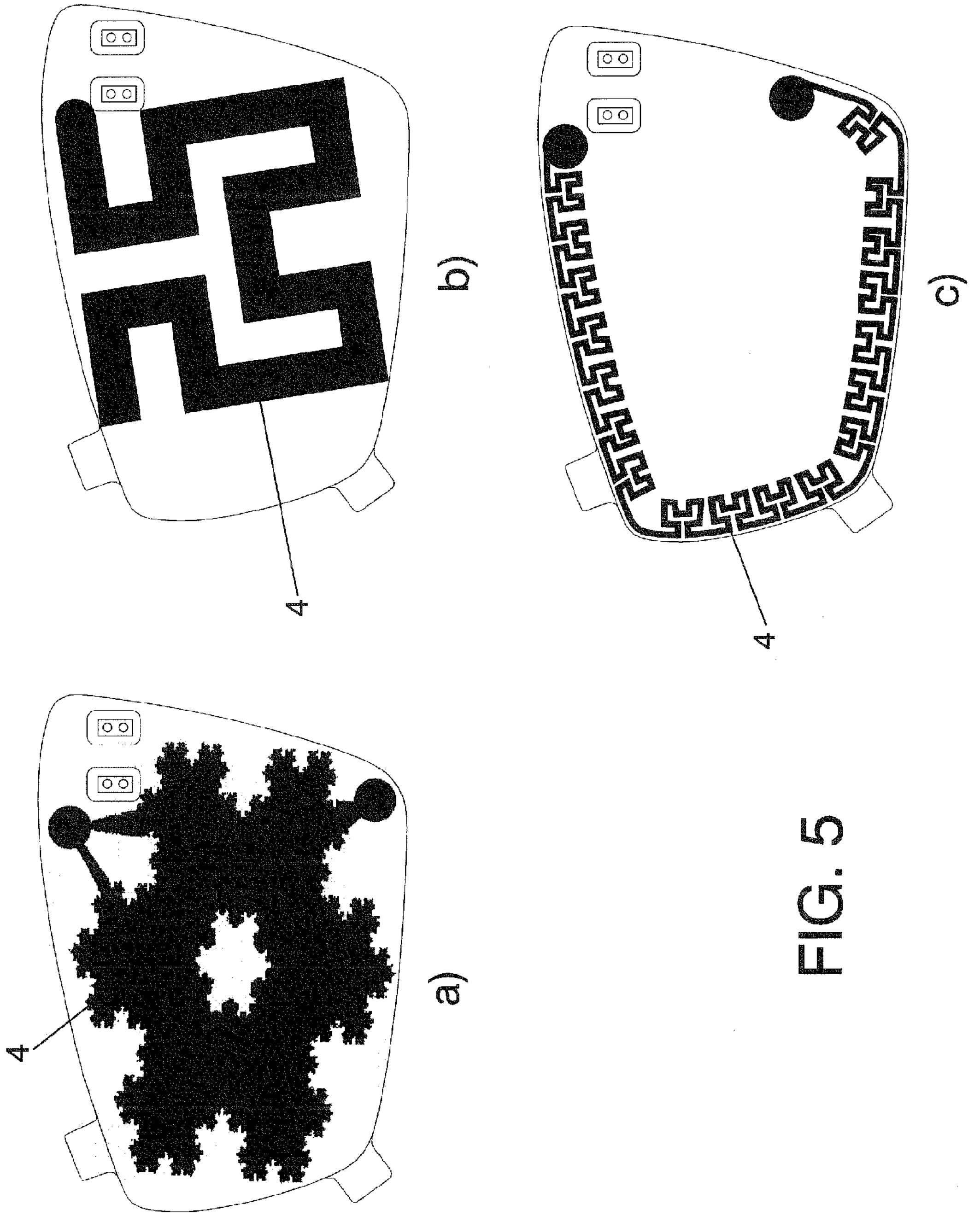
FIG. 5.—shows a similar representation than FIG. 4 of other three examples of the design of the conductive element using space-filling curves or fractal designs.

FIG. 5 (*b,c*) shows other examples of space-filling designs to shape the conductive element (4), and possible arrangements of the conductive element over the chrome layer. In FIG. 5 (*a*) the conductive element (4) has a fractal design.

Figure 6:
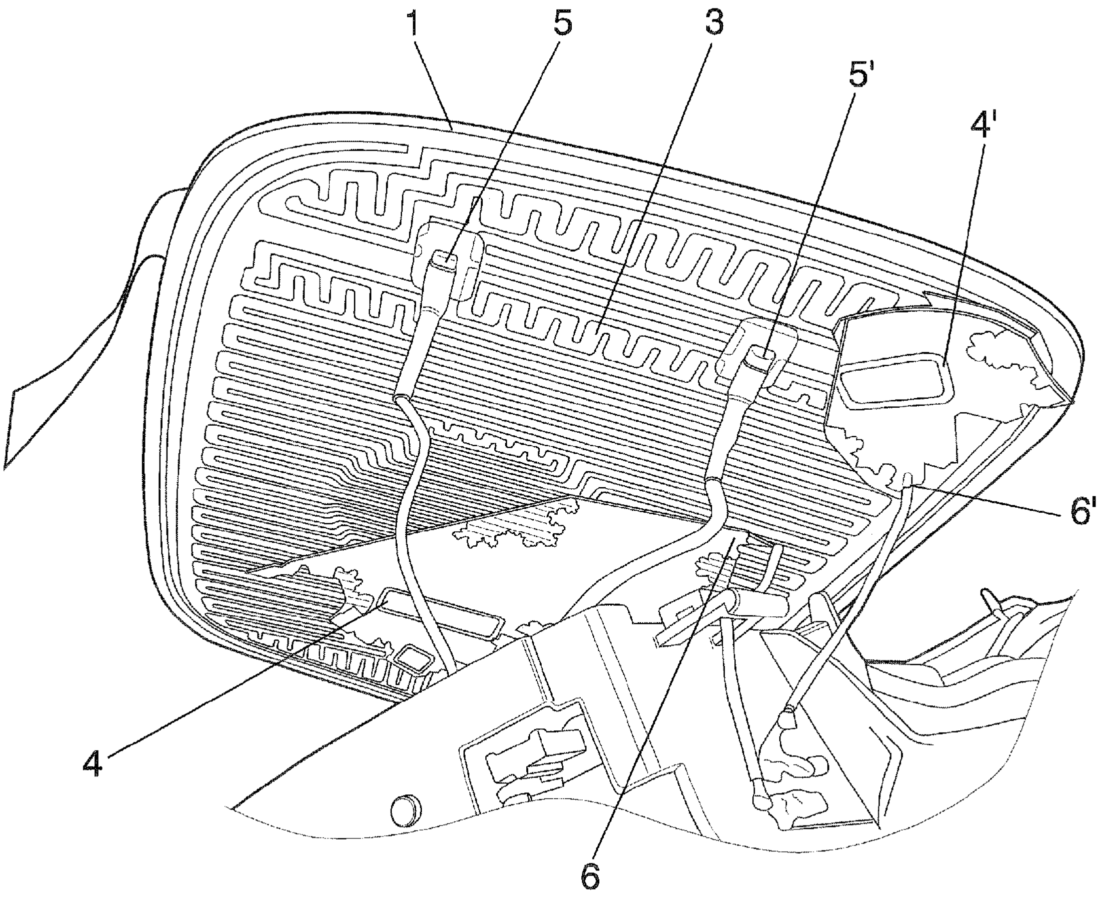
FIG. 6.—shows a perspective view of a rearview mirror device comprising two conductive elements arranged to be capacetively coupled with the heating conductor.

In the embodiment of FIG. 6, the rearview device includes two conducting elements, (4,4') both arranged parallel to the light-reflective surface (not visible in this figure), and both being capacetively coupled with the light-reflective surface. In this case, the light-reflective surface acts as a common radiating element for both conducting elements (4,4').

FIG. 6 shows a first conductive element (4) shaped and dimensioned to operate in a first frequency band, and a second conductive element (4') shaped and dimensioned to operate in a second frequency band. By using two or more conductive elements properly shaped and dimensioned, the RF reception system can operate at several frequency bands, for example, FM, TV, DAB-III, etc. Each conducting element (4,4') has one connection node (6,6') which is connected respectively with one of said the connection terminals (5,5') of the heater (3). At least a part of the conducting elements (4,4') is shaped as a space-filing curve, for example a part of the perimeter of the conducting elements (4,4').

Figure 7:
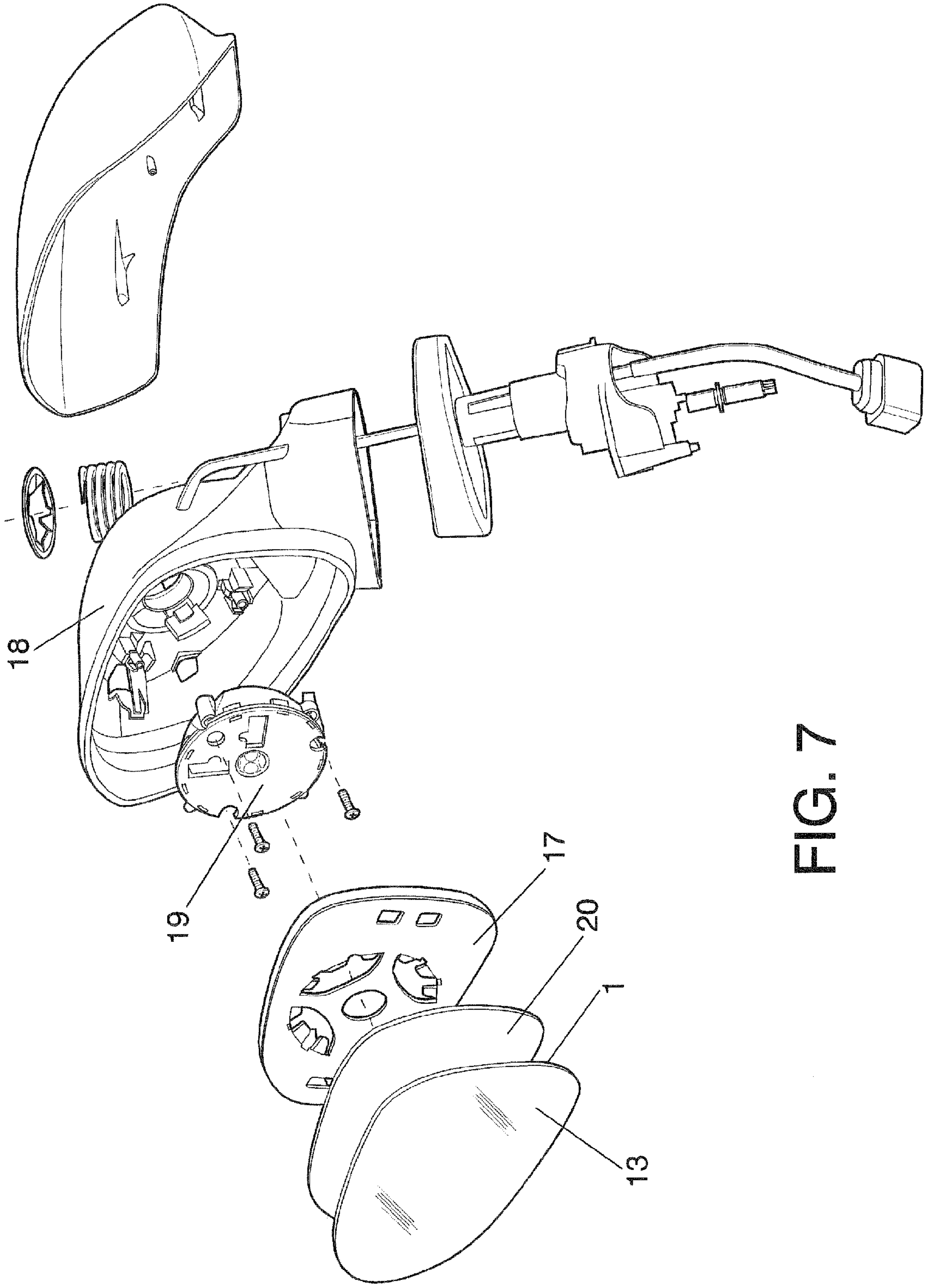
FIG. 7.—shows an exploded view of a rearview mirror device.

FIG. 7 shows an exploded view of a rearview mirror of the invention, which conventionally comprises a casing (18), a plastic support (17) to support the transparent support (13) with the chrome layer 1, and a motorized regulator (19) mounted inside the casing (18) which is meant to receive the plastic support (17).

A sandwiched arrangement (20) may consist in one of the arrangement shown in one of the FIG. 3 (*a,b,c*). The invention also refers to a motor vehicle comprising a radio receptor and a rearview mirror device as previously described.

The invention claimed is:

1. A rearview mirror device for motor vehicle incorporating a radio-frequency reception system, said device comprising:

a mirror surface made of an electrically conductive material, and at least one planar conductive element lying on a plane substantially parallel to said mirror surface, wherein the distance between the mirror surface and said conductive element, is selected in order to have the mirror surface and said conductive element capacitively coupled each other to define a capacitance value suitable for the reception of radio-frequency signals at a selected band of operation for the radio-frequency reception system, and wherein the planar conductive element is connected with the radio-frequency reception system, such as the mirror surface and the planar conductive element can operate as an antenna for the radio-frequency reception system.

2. The rearview mirror device of claim 1, wherein the mirror surface comprises chrome, and the distance between the mirror surface and said conductive element is selected to have a capacitance value greater than 1 pF.

3. The rearview mirror device of claim 1, further comprising a heating conductor arranged to heat said mirror surface, wherein the heating conductor has two connection terminals, and said conductive element is connected with at least one of said connection terminals.

4. The rearview mirror device of claim 3, wherein the distance between the heating conductor and the mirror surface is selected in order to have the heating conductor and the mirror surface capacitively coupled for receiving radio-frequency signals, wherein the capacitance value greater than 1 pF.

5. The rearview mirror device of claim 1, further comprising a first and a second dielectric substrates, and wherein the first and second dielectric substrates, the mirror surface, the heating conductor and the conductive element, are sandwiched together and arranged in such a manner that the mirror surface, the heating conductor and the conductive element are separated by the first and the second dielectric substrates.

6. The rearview mirror device of claim 1 further comprising conducting element having two connection nodes, wherein each connection node is connected with one of said connection terminal.

7. The rearview mirror device of claim 1 further comprising two conducting elements parallel to said mirror surface and capacitively coupled with the mirror surface, each conducting element having one connection node which is connected with one of said connection terminals.

8. The rearview mirror device of claim 7, wherein each conducting element is configured to receive different RF bands.

9. The rearview mirror device of claim 1, further comprising a splitter device for separating a RF and DC signals, said splitter device having two DC terminals provided for their connection to a DC power supply of a vehicle, and two RF terminals connected to said two connection terminals of the heating conductor, and a RF output.

10. The rearview mirror device of claim 1, wherein at least a part of said conductive element is shaped as space-filling curve.

11. The rearview mirror device of claim 1, further comprising a matching conductor having an electrical length to generate an inductive component needed to match the antenna's impedance and connect the antenna to an RF amplifier.

12. The rearview mirror device of claim 11, wherein at least a part of said matching conductor is shaped as space-filling curve.

13. The rearview mirror device of claim 10, wherein said space-filling curve is defined as a curve composed by at least ten segments, said segments being shorter than a tenth of the free-space operating wavelength, wherein said segments are connected in such a way that each segment forms an angle with their neighbours, that is, no pair of adjacent segments define a larger straight segment, and wherein the space-filling curve does not intersect with itself at any point except optionally at the initial and final points of the space-filling curve.

14. The rearview mirror device of claim 1 further comprising a casing and the wherein the heating conductor and the at least one planar conductive element are housed inside said casing.

15. A motor vehicle comprising a radio receptor and the rearview mirror device of claim 1, wherein said two connection terminals are connected to a DC power supply of the vehicle, and the RF output of the splitter is connected to said radio receptor.

* * * * *